United States Patent [19]

Fraisse

[11] Patent Number: 5,077,627
[45] Date of Patent: Dec. 31, 1991

[54] SOLID-STATE TRIP DEVICE FOR A PROTECTIVE CIRCUIT BREAKER OF A THREE-PHASE MAINS SYSTEM, ENABLING THE TYPE OF FAULT TO BE DETECTED

[75] Inventor: Didier Fraisse, St. Martin D'Heres, France

[73] Assignee: Merlin Gerin, Meylan, France

[21] Appl. No.: 518,513

[22] Filed: May 2, 1990

[30] Foreign Application Priority Data

May 3, 1989 [FR] France .................................. 89 06031

[51] Int. Cl.⁵ .............................................. H02H 3/08
[52] U.S. Cl. ...................................................... 361/93
[58] Field of Search ....................... 361/93, 94, 47, 49, 361/87, 48; 364/483, 492

[56] References Cited

U.S. PATENT DOCUMENTS

| | | | |
|---|---|---|---|
| 3,488,559 | 1/1970 | Souillard | 361/47 |
| 4,006,387 | 2/1977 | Hudak | 361/87 |
| 4,717,985 | 1/1988 | Demeyer | 364/483 |
| 4,722,059 | 1/1988 | Engel et al. | 364/483 |
| 4,751,653 | 6/1988 | Junk et al. | 364/492 |

FOREIGN PATENT DOCUMENTS

| | | |
|---|---|---|
| 0020047 | 12/1980 | European Pat. Off. . |
| 1961774 | 6/1970 | Fed. Rep. of Germany . |
| 2609654 | 9/1977 | Fed. Rep. of Germany ...... 364/483 |

OTHER PUBLICATIONS

Patent Abstracts of Japan, vol. 7, No. 32 (P-174)(1177) Feb. 8, 1983, 57-184,980.

*Primary Examiner*—Geoffrey S. Evans
*Attorney, Agent, or Firm*—Parkhurst, Wendel & Rossi

[57] ABSTRACT

The solid-state trip device of a protective circuit breaker of a three-phase mains system comprises a fault type detection circuit comparing the currents flowing in the mains system conductors with a first threshold and a second threshold, higher than the first one. It supplies a signal representative of a certain type of fault, single-phase or two series pole, when a first number of currents are lower than the first threshold and a second number of currents are higher than the second threshold.

9 Claims, 3 Drawing Sheets

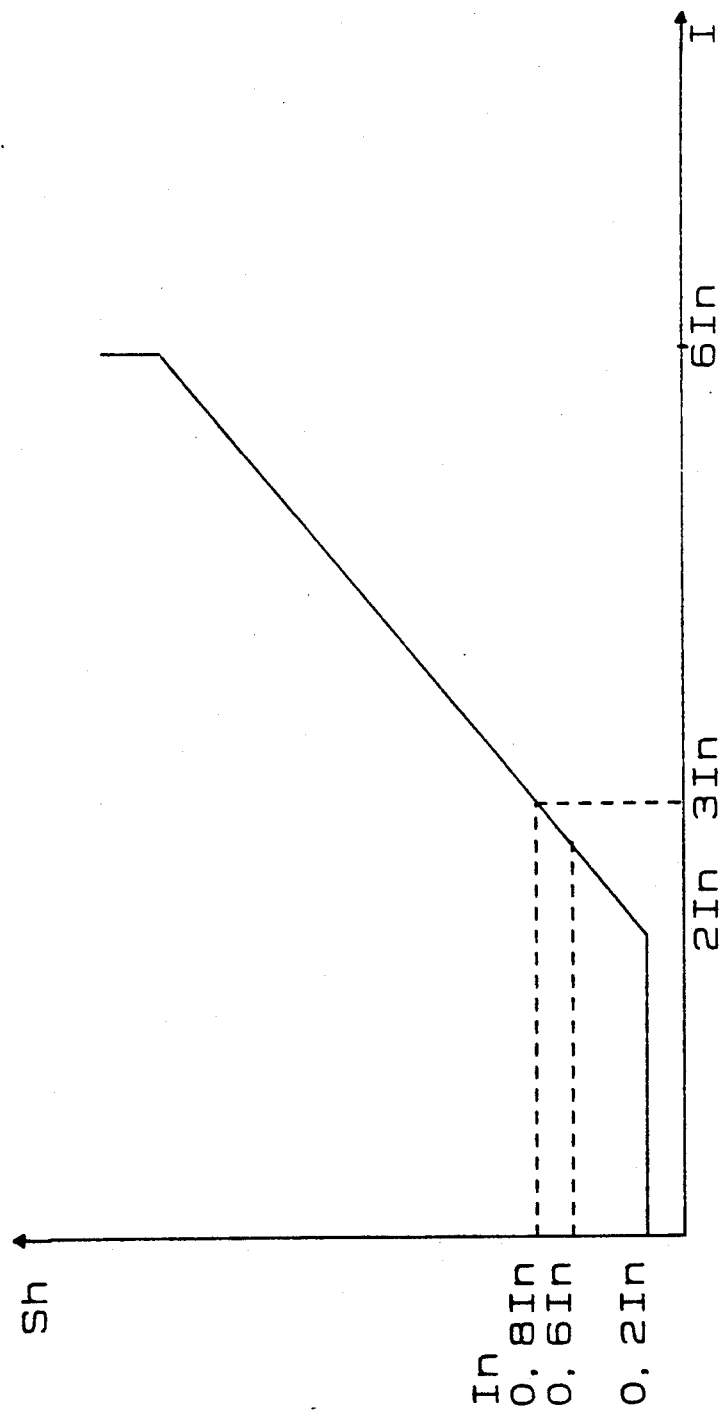

SOLID-STATE TRIP DEVICE FOR A PROTECTIVE CIRCUIT BREAKER OF A THREE-PHASE MAINS SYSTEM, ENABLING THE TYPE OF FAULT TO BE DETECTED

BACKGROUND OF THE INVENTION

The invention relates to a solid-state trip device for an electrical circuit breaker designed to protect a three-phase mains system, comprising current detection means, delivering analog signals proportional to the currents flowing in the mains system conductors, and an electronic processing unit to which said signals are applied and which delivers a circuit breaker tripping order in the event of preset thresholds being exceeded by said signals.

State-of-the-art trip devices perform conventional protection functions, notably long time delay, short time delay, and instantaneous tripping, and possibly earth fault protection, without making a distinction between faults affecting one or more phases of the system. In a certain number of cases, state-of-the-art trip devices do not provide suitable protection when they treat an unbalanced fault in the same way as a fault affecting the three phases.

SUMMARY OF THE INVENTION

According to the invention this drawback is overcome by the fact that the electronic processing unit comprises fault type detection means, comprising comparison means of said signals with a first threshold, comparison means with a second threshold, higher than the first one, and means whereby it can be determined whether at least a first predetermined number of signals are lower than the first threshold whereas, at the same time, at least a second predetermined number of signals are higher than the second threshold.

According to a first alternative embodiment, the existence of a single-phase fault is detected by making sure that two conductors of the system, three in the case of a three-phase system with neutral, having flowing in them currents lower than the first threshold, which is for example in the order of 1.5 In (In being the rated circuit breaker current), whereas another conductor of the system has flowing in it a current greater than the second threshold, which is for example 5 In.

The signal delivered by the fault type detection means when a single-phase fault is detected is used by the electronic processing unit to provide suitable protection.

Although the long and short time delay protections are well-suited in the case of a three-phase fault, they prove too slow in the case of a single-phase fault, expressing a mains system unbalance, and detection of this type of fault enables the electronic processing unit to shunt the long or short time delay functions, and to open the circuit breaker more quickly.

According to a second alternative embodiment of the invention, the existence of a "two series pole" type fault in a three-phase system with neutral is detected by making sure that two conductors of the system have flowing in them currents lower than the first threshold, which is for example in the order of In, whereas two conductors have flowing in them currents greater than the second threshold, which is for example in the order of 2 or 3 In.

According to a particular embodiment, as the electronic processing unit comprises means of achieving an earth fault protection function and earth fault protection desensitization means when the measured signals exceed a preset threshold, the output signal from the fault type detection means inhibits said desensitization means when it is representative of a two series pole type fault.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 3 illustrates the desensitized earth fault tripping threshold in terms of the maximum current in the conductors of the system.

DESCRIPTION OF THE PREFERRED EMBODIMENT

Figure 1:
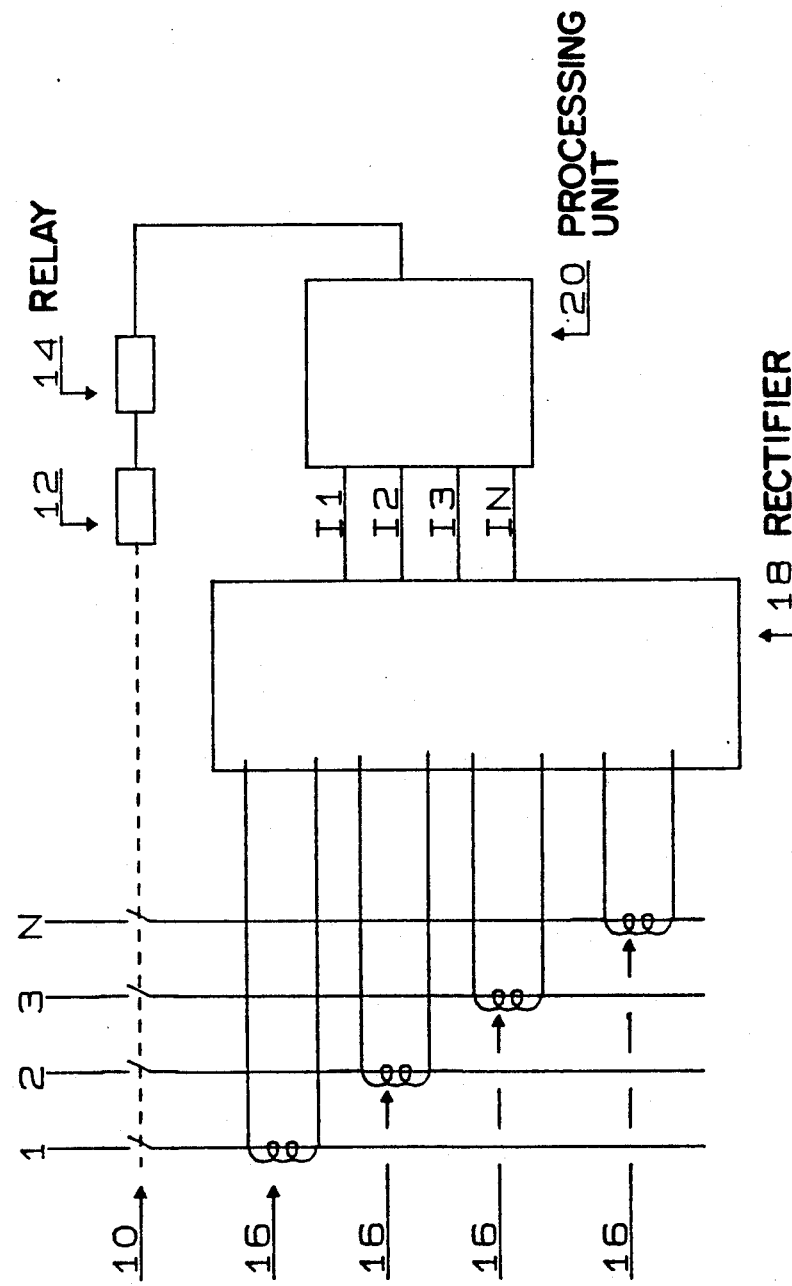
FIG. 1 represents a simplified block diagram of a trip device in which the invention can be implemented.

In FIG. 1, a three-phase electrical distribution system, comprising three conductors of three phases 1, 2, 3 and a neutral conductor N comprises a circuit breaker 10 capable of interrupting the circuit in the open position. The mechanism 12 of the circuit breaker 10 is controlled by a polarized relay 14 controlling tripping of the circuit breaker in the event of an overload or a short-circuit. Each conductor (1, 2, 3, N) has associated with it a current transformer 16 which delivers an analog signal representative of the current flowing in the associated conductor. These signals are applied to a rectifier circuit 18 whose outputs I1, I2, I3 and IN are applied to an electronic processing unit 20 whose output controls the polarized relay 14.

The trip device performs standard protection functions, notably long time delay and/or short time delay trips when a fault occurs in the system. It is unnecessary to give a detailed description of these protection functions which are well-known to those specialized in the art.

Figure 2:
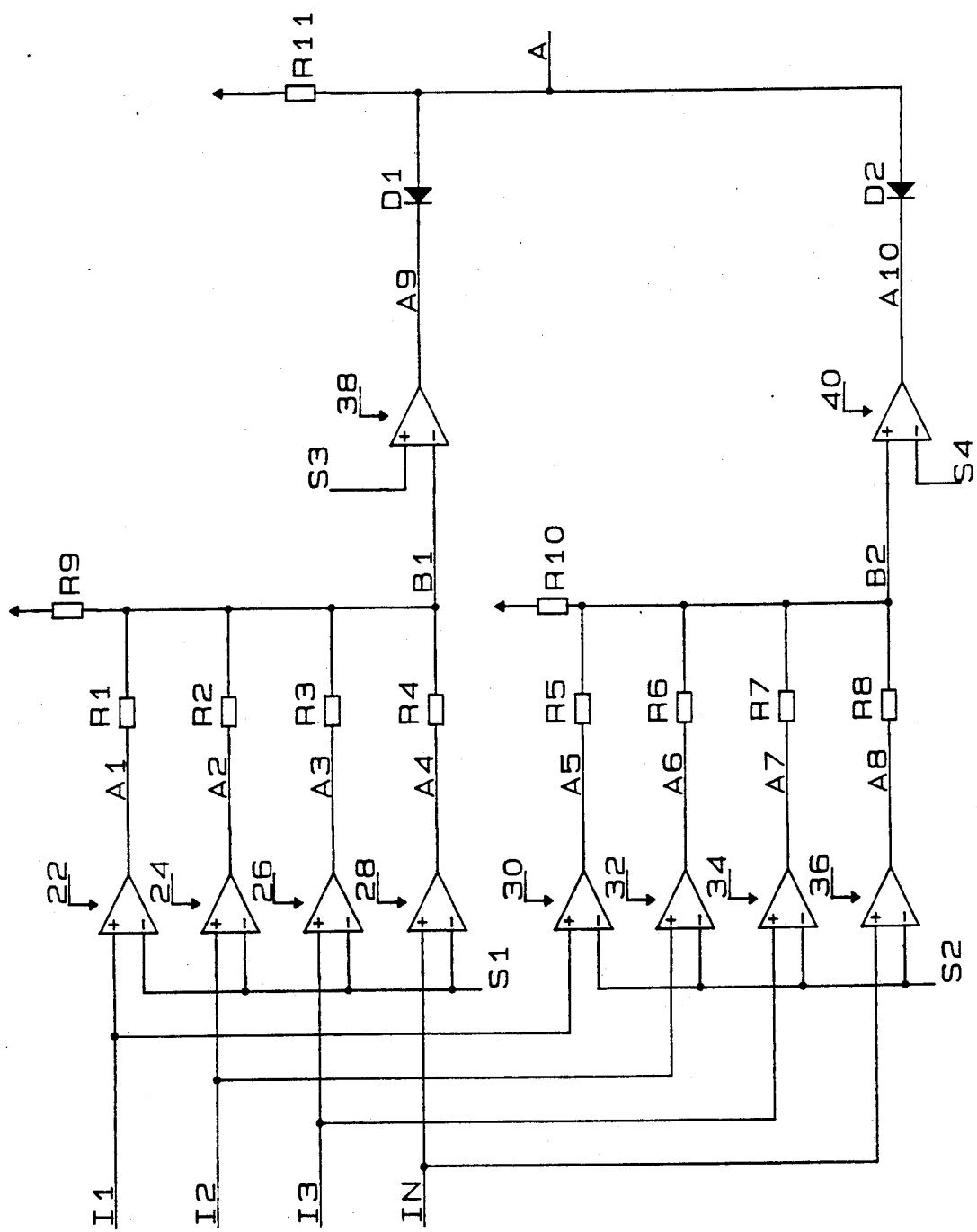
FIG. 2 represents a preferred embodiment of the fault type detection means according to the invention.

According to the invention the unit 20 comprises fault type detection means a particular embodiment of which is represented in FIG. 2.

The signals I1, I2, I3 and IN, representative of the currents flowing in the conductors of the system are applied to the input of the fault type detection means.

In FIG. 2, these signals are respectively on the non-inverting input of one of the operational amplifiers of a first series of amplifiers 22 to 28. The inverting inputs of all the amplifiers of this first series are connected to a single threshold voltage S1. In this way the output signals A1, A2, A3 and A4 from the amplifiers of the first series respectively switch to logic level 1 when the corresponding input current I1, I2, I3 and IN is greater than the threshold S1.

Similarly, the amplifiers of a second series of operational amplifiers 30 to 36 receive on their non-inverting inputs the respective currents I1, I2, I3 and IN, whereas their inverting inputs are connected to a single threshold voltage S2. The output signals A5, A6, A7 and A8 from the amplifiers of the second series therefore respectively switch to logic level 1 when the corresponding input current is greater than the threshold S2.

The outputs (A1 to A4) of the amplifiers (22–28) of the first series are respectively connected, by means of a resistor (R1 to R4), to the inverting input of an operational amplifier 38, this inverting input also being connected, by means of a resistor R9, to a supply voltage Vcc, this supply voltage also supplying all the operational amplifiers. The non-inverting input of the amplifier 38 is connected to a reference voltage S3.

The outputs (A5 to A8) of the amplifiers (30-36) of the second series are respectively connected, by means of a resistor (R5 to R8), to the non-inverting input of an operational amplifier 40, this non-inverting input also being connected, by means of a resistor R10, to the supply voltage Vcc. The inverting input of the amplifier 40 is connected to a reference voltage S4.

The outputs A9 and A10 of the amplifiers 38 and 40 are respectively connected to the cathode of first and second diodes, D1 and D2, whose anodes are connected to the output A of the fault type detection circuit and, by means of a resistor R11, to the supply voltage.

Operation of the fault type detection circuit according to FIG. 2 is described below.

All the resistors (R1 to R4 and R9) connected to the inverting input of the amplifier 38 being identical, the signal B1 applied to this input takes the following values:

B1 = Vcc/5, when A1 = A2 = A3 = A4 = 0, i.e. when all the measured currents are lower than the threshold S1.

B1 = 2Vcc/5, when one of the currents is greater than S1.

B1 = 3Vcc/5, when 2 of the currents are greater than S1.

B1 = 4Vcc/5, when 3 of the currents are greater than S1.

B1 = Vcc, when all the currents are greater than S1, (A1 = A2 = A3 = A4 = 1).

Similarly, all the resistors (R5 to R8 and R10) connected to the non-inverting input of the amplifier 40 being identical, the signal B2 applied to this input takes the following values:

B2 = Vcc/5, when all the measured currents are lower than the threshold S2 (A5 = A6 = A7 = A8 = 0)

B2 = 2Vcc/5, when one of the currents is greater than S2.

B2 = 3Vcc/5, when 2 of the currents are greater than S2.

B2 = 4Vcc/5, when 3 of the currents are greater than S2.

B2 = Vcc, when all the currents are greater than S2, (A5 = A6 = A7 = A8 = 1).

The output signal A9 from the amplifier 38 being at logic level 1 so long as B1 is lower than the reference voltage S3, and switching to logic level 0 as soon as B1 is greater than S3, the choice of the reference voltage S3 enables a signal to be obtained on A9 representative of the number of signals A1, A2, A3, A4 at logic level 0, and therefore of the number of currents lower than the threshold S1.

Similarly, the output signal A10 from the amplifier 40 being at logic level 0 so long as B2 is lower than the reference voltage S4, and switching to logic level 1 as soon as B2 is greater than S4, the choice of the reference voltage S4 enables a signal to be obtained on A10 representative of the number of signals A5, A6, A7, A8 at logic level 1, and therefore of the number of currents greater than the threshold S2.

The diodes D1 and D2 perform a logic AND function between the outputs A9 and A10. The output A of the fault type detection circuit is in fact at logic level 1 only if the two outputs A9 and A10 are both at logic level 1. The signal A is thus representative of the fact that at least a predetermined number of currents is lower than the threshold S1 (A9 = 1) whereas at least another predetermined number of currents is greater than the threshold S2 (A10 = 1).

By a suitable choice of the threshold voltages S1 and S2 and reference voltages S3 and S4, different types of faults can be detected.

According to a first alternative embodiment, the reference voltages S3 and S4 are chosen such that:

$$2 Vcc/5 < S3 < 3Vcc/5$$

$$Vcc/5 < S4 < 2Vcc/5$$

Under these conditions, the signal A9 is at logic level 1 when at least three currents are lower than S1 and the signal A10 is at logic level 1 when at least one current is greater than S2. The threshold voltage S2 being greater than the threshold voltage S1, the output signal A of the fault type detection circuit therefore only switches to logic level 1 when three currents are lower than S1 whereas one current is greater than S2. Such a signal is representative of a single-phase fault. To give a non-restrictive example, the threshold voltages S1 and S2 can be respectively in the order of 1.5 In and 5 In.

Similarly, a single-phase fault can be detected in a three-phase system not comprising a neutral conductor N. In this case as the circuit only comprises three inputs I1, I2 and I3, the signal A must be representative of the fact that two currents are lower than S1 and one current greater than S2. To achieve this the reference voltages S3 and S4 are such that:

$$Vcc/2 < S3 < 3Vcc/4$$

$$Vcc/4 < S4 < Vcc/2$$

According to another alternative embodiment, for a three-phase system with neutral, the reference voltages S3 and S4 are chosen such that:

$$3Vcc/5 < S3 < 4Vcc/5$$

$$2Vcc/5 < S4 < 3Vcc/5$$

Under these conditions, the signal A9 is at logic level 1 when at least two currents are lower than S1 and the signal A10 is at logic level 1 when at least two currents are greater than S2. The threshold voltage S2 being greater than the threshold voltage S1, the output signal A of the fault type detection circuit therefore only switches to logic level 1 when two currents are lower than S1 whereas two currents are greater than S2. Such a signal is representative of a two series pole fault, the same fault current, greater than S2, flowing in two conductors of the system, whereas a relatively weak current, lower than S1, is flowing in the other two conductors of the system. To give a non-restrictive example, the voltages S1 and S2 can be chosen respectively in the order of In and 2 or 3 In.

In the embodiment particularly described above, the fault type detection circuit is an analog circuit. The invention is in no way limited to this type of embodiment. It can quite on the contrary be accomplished by any means whereby it can be simultaneously determined that a first predetermined number of signals are lower than a first threshold S1 whereas a second predetermined number of signals are higher than a second threshold S2. In microprocessor-based trip devices, this can naturally be achieved directly by the microprocessor to which the signals (I1-IN) representative of the currents flowing through the conductors of the system are applied.

In the event of a single-phase fault being detected, the electronic processing unit 20 of the trip device shunts the long or short time delay functions and causes high-speed opening of the circuit breaker.

Detection of a two series pole type fault is, for its part, used in a trip device performing an earth protection function and comprising earth protection desensitization means when the measured signals exceed a preset threshold, to inhibit these desensitization means when a two series pole type fault is detected. Indeed, in a polyphase system, when the currents in the conductors of the system are higher than a certain threshold, for example 2 In, their vector sum is not nil, even in the absence of an earth fault. The signal thus obtained is called false earth fault current. To avoid spurious tripping of circuit breakers, due not to an earth fault but to the existence of this false earth fault current, state-of-the-art circuit breakers providing an earth protection function generally comprise an earth protection desensitization system. These systems enable either the earth fault tripping threshold Sh to be increased as represented in FIG. 3, or the earth fault signal to be decreased, when the current flowing in one of the phases exceeds a certain threshold, for example 2 In. This protection, which is efficient if the fault is three-phase, can mask an earth fault occurring on a very lightly loaded phase conductor, in which the current (for example 0.6 In in FIG. 3) is only slightly higher than the normal earth fault tripping threshold (0.2 In), if the other two phase conductors are very heavily loaded, for example with a current of 3 In running through them. Indeed in this case, state-of-the-art trip devices desensitize the earth protection, for example by increasing this tripping threshold Sh to a higher value(0.8 In in FIG. 3) than the earth fault (0.6 In) to be detected.

When a two series pole type fault affects the system two conductors have a relatively high (for example 3 In) current flowing in them, identical in phase and amplitude, and the false earth fault current is practically nil. Desensitization of the earth fault protection (Sh=0.8 In for I=3 In) then prevents an earth fault (comprised between 0.2 and 0.8 In) affecting a lightly loaded conductor from being detected. Yet the circuit breaker must react quicker to an earth fault than to the fault, of the short time delay type, affecting the two series poles. The electronic processing unit 20 receiving a signal A representative of two series pole type fault inhibits desensitization of the earth fault protection, thus enabling the trip device to detect an earth fault in another conductor of the system. It does not seem necessary to give a more detailed description of the means required for this inhibition, which can be achieved in a conventional manner, either by analog means or by programming in the case of a microprocessor-based trip device.

I claim:

1. A solid-state trip device for an electrical circuit breaker designed to protect a three-phase mains system, comprising:
current detection means for delivering analog signals proportional to the currents flowing in the mains system conductors, and an electronic processing unit to which said signals are applied for supplying a circuit breaker tripping order to a trip device in the event of preset thresholds being exceeded by said signals, wherein the electronic processing unit comprises fault type detection means including first comparison means for comparing said signals with a first threshold, second comparison means for comparing said signal with a second threshold higher than the first threshold, and means for determining whether at least a first predetermined number of said signals is lower than the first threshold whereas, at the same time, at least a second predetermined number of signals is higher than the second threshold.

2. The trip device according to claim 1, wherein the fault type detection means delivers a signal representative of a single-phase fault when said first number is equal to two and said second number to one.

3. The trip device according to claim 1, wherein, the mains system being a three-phase system with neutral, the fault type detection means delivers a signal representative of a single-phase fault when said first number is equal to three and said second number to one.

4. The trip device according to claim 1, wherein the first threshold is about 1.5 In and the second threshold is about 5 In, where In is the rated circuit breaker current.

5. The trip device according to claim 1, wherein, the mains system being a three-phase system with neutral, the fault type detection means delivers a signal representative of a two series pole type fault when said first and second numbers are both equal to two.

6. The trip device according to claim 5, wherein the electronic processing unit comprising means for achieving an earth fault protection function and means for desensitizing an earth fault protection when the measured signals exceed a preset threshold, the output signal from the fault type detection means inhibits said desensitization means when it is representative of a two series pole type fault.

7. The trip device according to claim 5, wherein the first threshold is about In and the second threshold 2 or 3 In, wherein In is the rated circuit breaker current.

8. The trip device according to claim 1, wherein said electronic processing unit comprises a microprocessor-based unit.

9. The trip device according to claim 1, wherein the signal comparison means to a first threshold comprise a first series of operational amplifiers each receiving on their non-inverting inputs the signal representative of the current flowing in one of the mains system conductors and on their inverting inputs a signal representative of said first threshold, the outputs of said operational amplifiers being respectively connected by means of a resistor to the inverting input of a first operational amplifier, also connected by means of a resistor to a supply voltage, said first operational amplifier receiving on its non-inverting input a first reference voltage determined in such a way that its output is at logic level 1 when at least said first predetermined number of outputs of the amplifiers of the first series are at logic level 0, a second series of operational amplifiers each receiving on their non-inverting inputs the signal representative of the current flowing in one of the mains system conductors and on their inverting inputs a signal representative of said second threshold, the outputs of the amplifiers of the second series being respectively connected, by means of a resistor to the non-inverting input of a second operational amplifier, also connected, by means of a resistor, to the supply voltage, said second operational amplifier receiving on its inverting input a second reference voltage determined in such a way that its output is at logic level 1 when at least said second predetermined number of outputs of the amplifiers of the second series are at logic level 1, the outputs of the first and second operational amplifiers being respectively connected to the cathode of first and second diodes whose anodes are connected to the output of the fault type detection circuit and, by means of a resistor, to the supply voltage.

* * * * *